(12) United States Patent  (10) Patent No.: US 8,599,497 B2
Williams et al.  (45) Date of Patent: Dec. 3, 2013

(54) WIDE ANGLE THIN-PROFILE ZOOM

(75) Inventors: Darin Williams, Tucson, AZ (US); Kent P. Pflibsen, Tucson, AZ (US); Marc Berte, Ashburn, VA (US)

(73) Assignee: Raytheon Company, Waltham, MA (US)

( * ) Notice: Subject to any disclaimer, the term of this patent is extended or adjusted under 35 U.S.C. 154(b) by 46 days.

(21) Appl. No.: 13/411,531

(22) Filed: Mar. 3, 2012

(65) Prior Publication Data

US 2012/0224266 A1 Sep. 6, 2012

Related U.S. Application Data

(60) Provisional application No. 61/449,255, filed on Mar. 4, 2011.

(51) Int. Cl.
*G02B 17/00* (2006.01)
*G02B 15/14* (2006.01)
*G02B 27/10* (2006.01)

(52) U.S. Cl.
USPC .......................... 359/726; 359/676; 359/618

(58) Field of Classification Search
USPC .................. 359/618, 619, 642, 726, 676, 678
See application file for complete search history.

(56) References Cited

U.S. PATENT DOCUMENTS

| 5,121,220 | A | 6/1992 | Nakamoto |
| 5,396,303 | A | 3/1995 | Peters et al. |
| 5,748,365 | A | 5/1998 | Chen |
| 7,123,421 | B1 | 10/2006 | Moskovich et al. |
| 2007/0064313 | A1 | 3/2007 | Hosokawa |
| 2010/0188856 | A1 | 7/2010 | Ford et al. |
| 2010/0253999 | A1 | 10/2010 | Shafer et al. |

OTHER PUBLICATIONS

"International Application Serial No. PCT/US2012/027627, International Search Report mailed Jun. 28, 2012", 4 pgs.
"International Application Serial No, PCT/US2012/027627, Written Opinion mailed Jun. 28, 2012", 4 pgs.

*Primary Examiner* — Alicia M Harrington
(74) *Attorney, Agent, or Firm* — Schwegman, Lunderg & Woessner, P.A.

(57) ABSTRACT

Some embodiments pertain to an optical zoom system. The optical zoom system includes a first inward-facing surface that is at least partly reflective and a second inward-facing surface that is at least partly reflective. The optical zoom system further includes a first aperture that includes a plurality of sub-apertures which are positioned around at least a portion of an outer periphery of one of the first and second inward facing surfaces. Each sub-aperture includes an optically powered element. The optical zoom system further includes a second aperture that exists proximate a central region of the optical zoom system. Light is reflected on the first and second inward facing surfaces as the light travels between the first aperture and the second aperture such that the light is optically combined into a single image before exiting the second aperture.

15 Claims, 9 Drawing Sheets

WIDE ANGLE THIN-PROFILE ZOOM

CLAIM OF PRIORITY

This application claims the benefit of priority under 35 U.S.C. §119(e) to U.S. Provisional Patent Application Ser. No. 61/449,255, filed Mar. 4, 2011, the contents of which are incorporated herein by reference in its entirety.

TECHNICAL FIELD

Embodiments pertain to an optical system, and more particularly to a hands-free optical zoom system.

BACKGROUND

Current "hands-free" zoom optics are switchable zoom optics capable of providing 120 degree and 12 degree Fields-of-View (hereafter FOV) while providing scene apparent brightness of 50% in normal vision mode and greater than 25% in 10× zoom mode relative to normal daytime vision. Conventional optics designs imply that the large angle optics must both provide adequate aperture for the 120 degree FOV into a 3.5 mm eye pupil and an effective collection are of a 35 mm diameter entrance pupil at 12 degree FOV. The challenges for these requirements are considered in U.S. Pat. No. 7,123,421.

FIG. 1 shows an example prior art design having a greater than 90 degree FOV configuration. This design provides approximately one-half the desired entrance pupil diameter at the smaller FOV. This constraint implies that the lens elements would need to be doubled in diameter and thickness to support the brightness requirement for the 12 degree FOV.

Wide field zoom 10× lenses (e.g., 120 degrees or larger) are typically extraordinarily large and heavy, particularly when they are required to maintain the apparent brightness of the naked eye. As an example, a 10× zoom requires 100× the photon collection area of the human eye to maintain the same brightness. In addition, maintaining the apparent brightness of the naked eye at 10× zoom usually requires at least 100× the open aperture. As these instances get worse, most optical systems usually have to increase the f# with larger apertures to overcome distortion.

In some existing systems, color correcting a 12 degree FOV at 10× magnification, filling the entire human 120 degree FOV typically requires a very complicated stack of lenses. As the input aperture gets larger, distortion produces a more and more severe limit, generally forcing operation at a stopped down f#, which requires an even larger aperture to maintain collection efficiency. In some existing systems, when you need 1× and 10×, eyepiece vignetting limits off-axis capability.

FIG. 2 illustrates another example prior art optical zoom configuration that includes a flat-optic where the entrance pupil is circumferential. The illustrated flat-optic might be adapted to 10× magnification; however, it requires powered surfaces in the internal reflections.

As an example, some optical systems have historically often included a first inward-facing surface that is at least partly reflective and a second inward-facing surface that is at least partly reflective. These reflective surfaces are known to reflect received light toward an aperture. US2010/0188856A1 utilized this known type of technology to development a flat-optic.

One of the drawbacks with the flat-optic is that it cannot reasonably be adapted to multiple levels of zoom. Another drawback with the flat-optic is that it typically requires significant manufacturing start up expense.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments described herein utilize gradient index lenses and high index meta materials to dramatically reduce the total weight and size of a 10× 12 degree optical zoom system. Some embodiments may also include flat-optic lenses that use a circumferential open aperture with repeated internal reflection to obtain the effect of a long focal length in a very short/light package.

The drawbacks with existing optical zoom systems may be overcome by using a set of small powered apertures, each of which exceeds the diffraction limit of the human eye, and combining the photons from these apertures optically using a repeated double bounce system. In some embodiments, instead of having a single large aperture, the system may use multiple small lenses.

Figure 1:
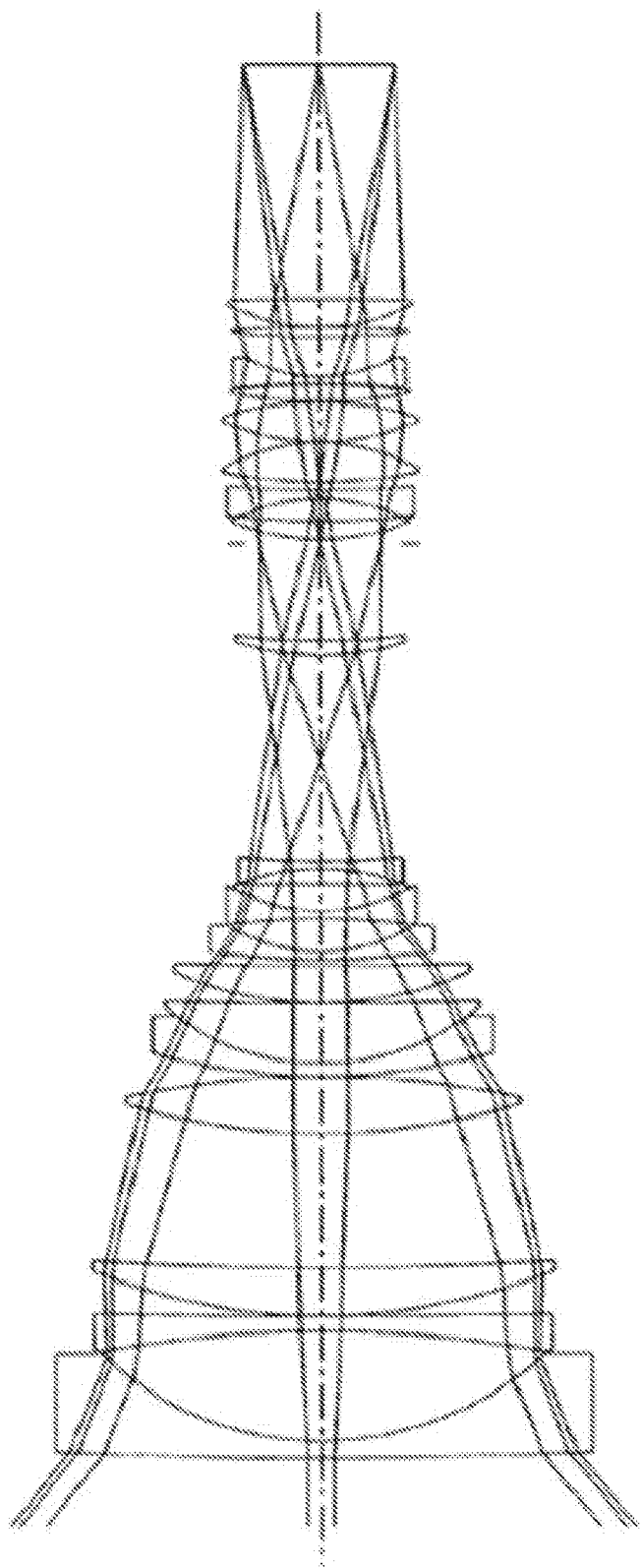
FIG. 1 illustrates an example prior art optical zoom configuration.
Figure 2:
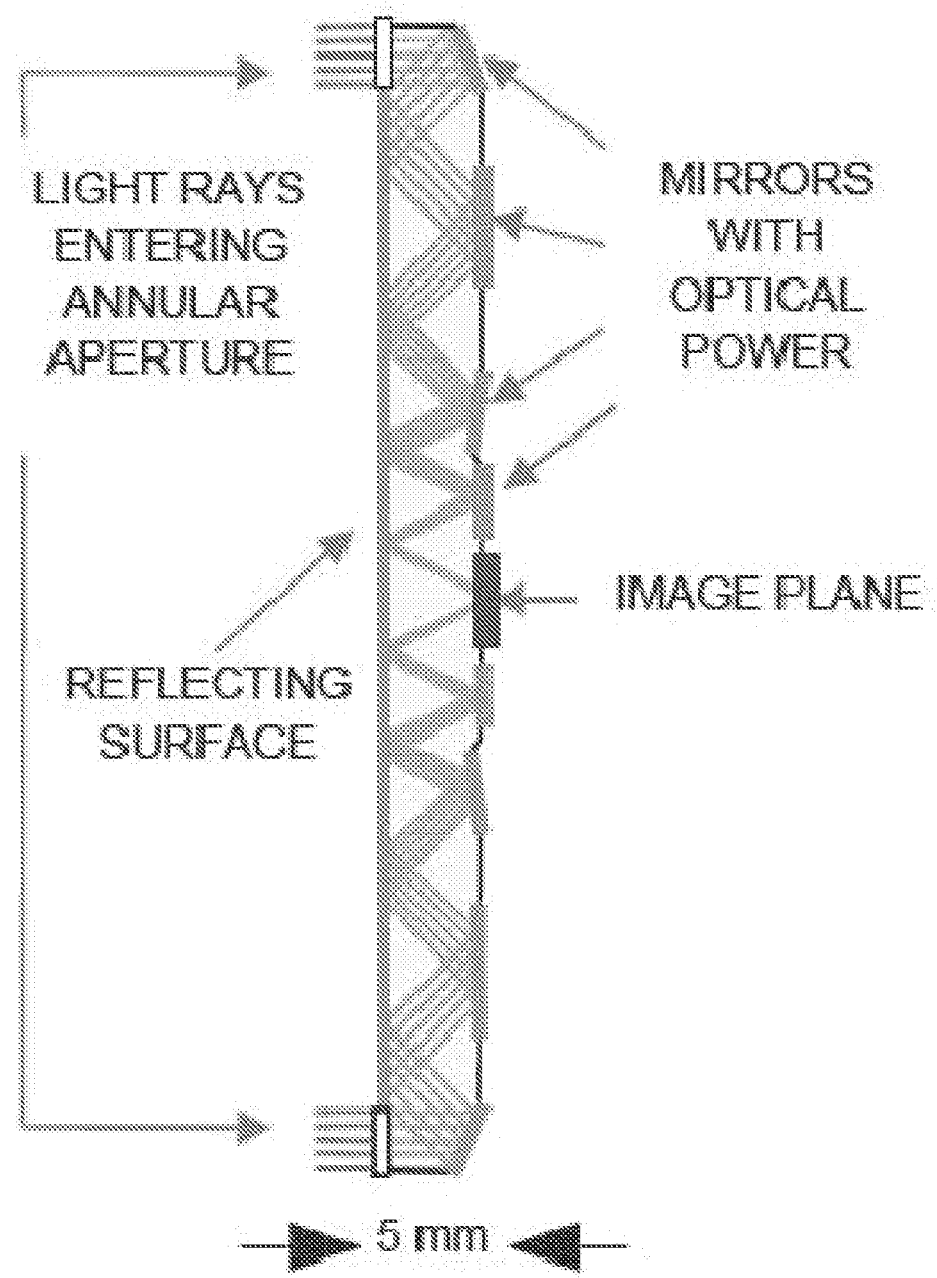
FIG. 2 illustrates another example prior art optical zoom configuration.
Figure 3:
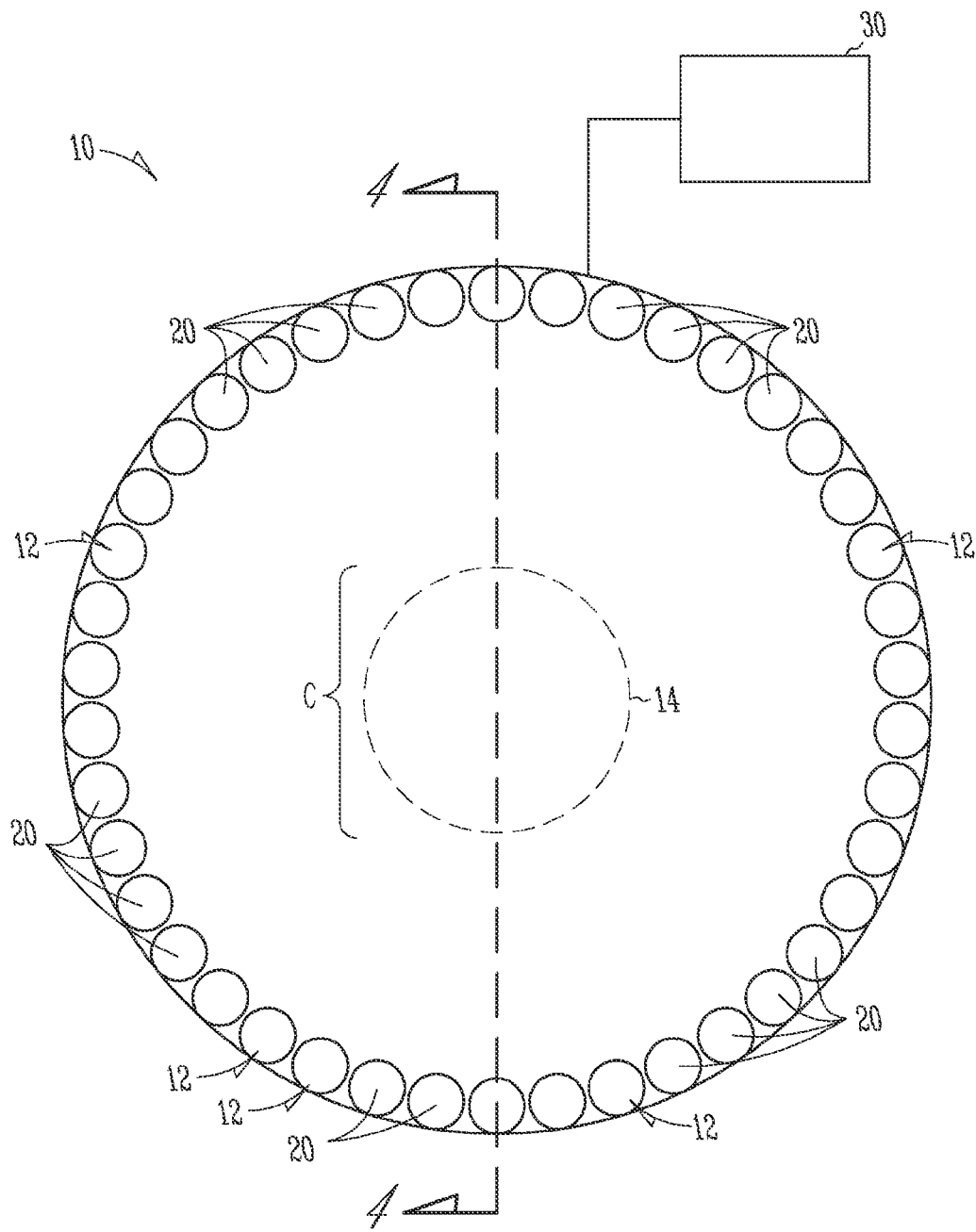
FIG. 3 shows a front view of an example optical zoom system.
Figure 4:
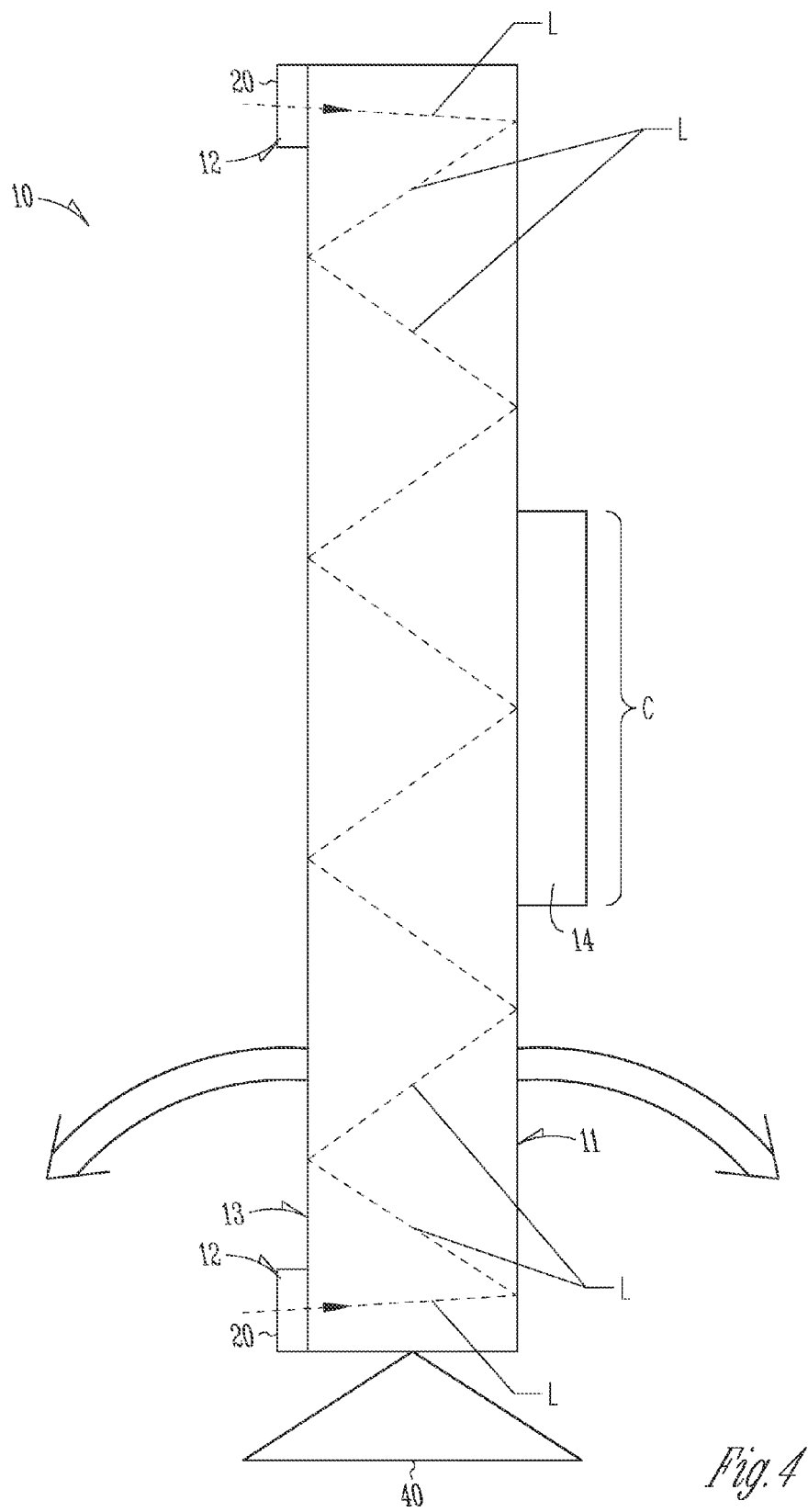
FIG. 4 shows a section view of the example optical zoom system shown in FIG. 3 taken along line 4-4 where light is passing through some of the sub-apertures.
Figure 5:
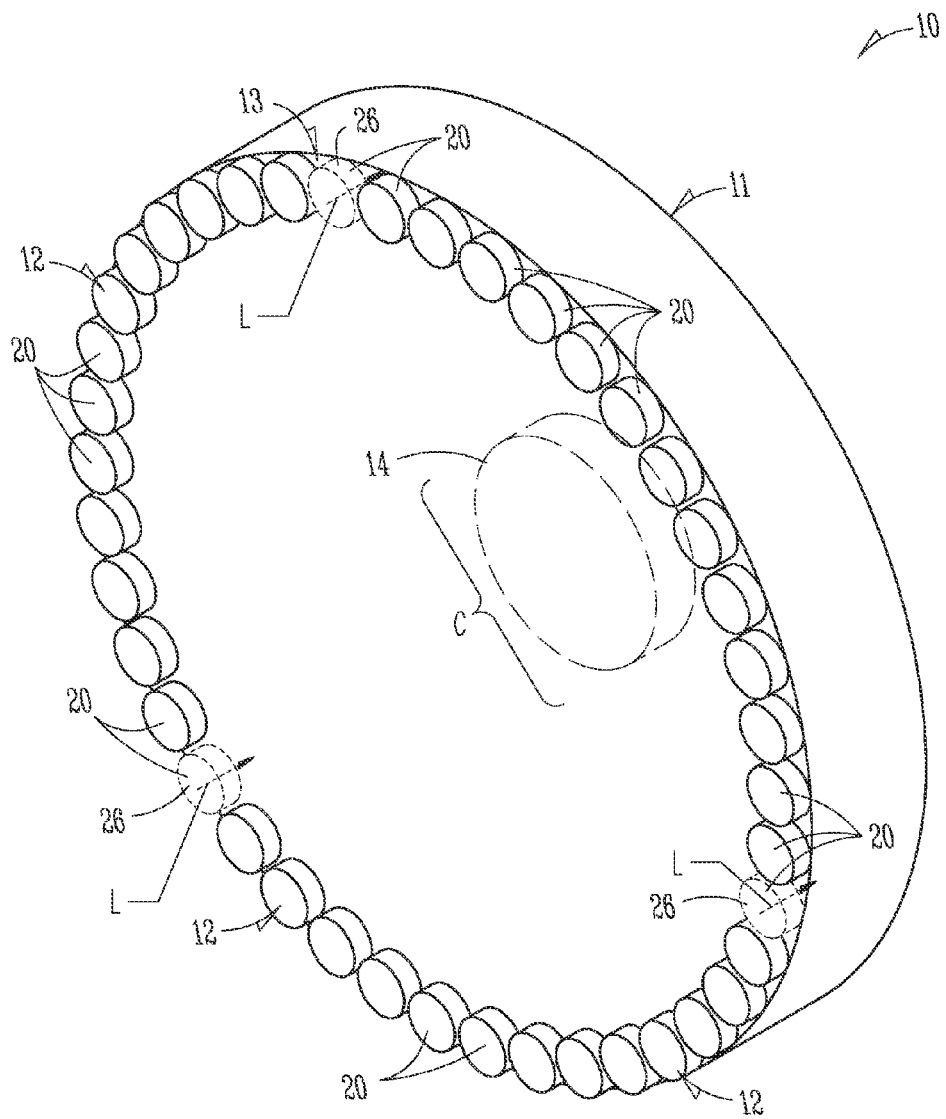
FIG. 5 shows a perspective view of the example optical zoom system shown in FIGS. 3 and 4 where light is passing through apertures with 10× magnification.

FIGS. 3 and 4 show an example 4 mm diameter lenslet that may be used in combination with an eye piece. It should be noted that diffraction may not be an issue, just area.

Some embodiments may optically combine lenses into the eyepiece which may only require flat internal surfaces. The flat internal reflective surfaces may be easier and cheaper to manufacture. There may be a positive available cost trade for non-coherent vs. coherent combination of individual apertures.

In addition, since this approach may not use powered internal surfaces, it might be easily adapted to provide multiple magnification steps, using different combinations of input micro-lenses with some form of shuttering to select among them (e.g., electronic). Non-magnified viewing may be provided via a shutter-able straight-through path, or by flipping up the magnifier.

The optical zoom systems described herein may optically combine the output of multiple lenses using internal reflections in a thin profile flat package. The electronics may include features that perform shuttering selection of different sets of micro lenses to change magnification (and/or use electronically adjustable lens elements for continuous adjustment).

Embodiments are also contemplated that include shutter fold up or electronic shutter pass through for 1× viewing. Some embodiments include a central optic for pass-though viewing with an electronic shutter for switching to a magnified view. In other embodiments, the optical zoom system may be moved (i.e., folded) out of the way to provide 1× viewing, which is made possible by its relatively light weight (20-70 grams).

Some embodiments may include an optional optical shutter to turn off individual elements so you can have different powers of magnification. As examples, 5× magnification may take one-quarter of the number of lenses as 10× magnification, and 2× magnification takes 4% of the number of lenses as 10× magnification.

The system would have a relatively small size/weight impact for multiple levels of zoom. In addition, the system may add electronically tunable lenses for a continuously variable zoom within the range of each zoom step (e.g., 2×, 5×, 10×). This zoom variability may be combined with switching between zoom steps to provide a larger range of continuous zoom.

Figure 8:
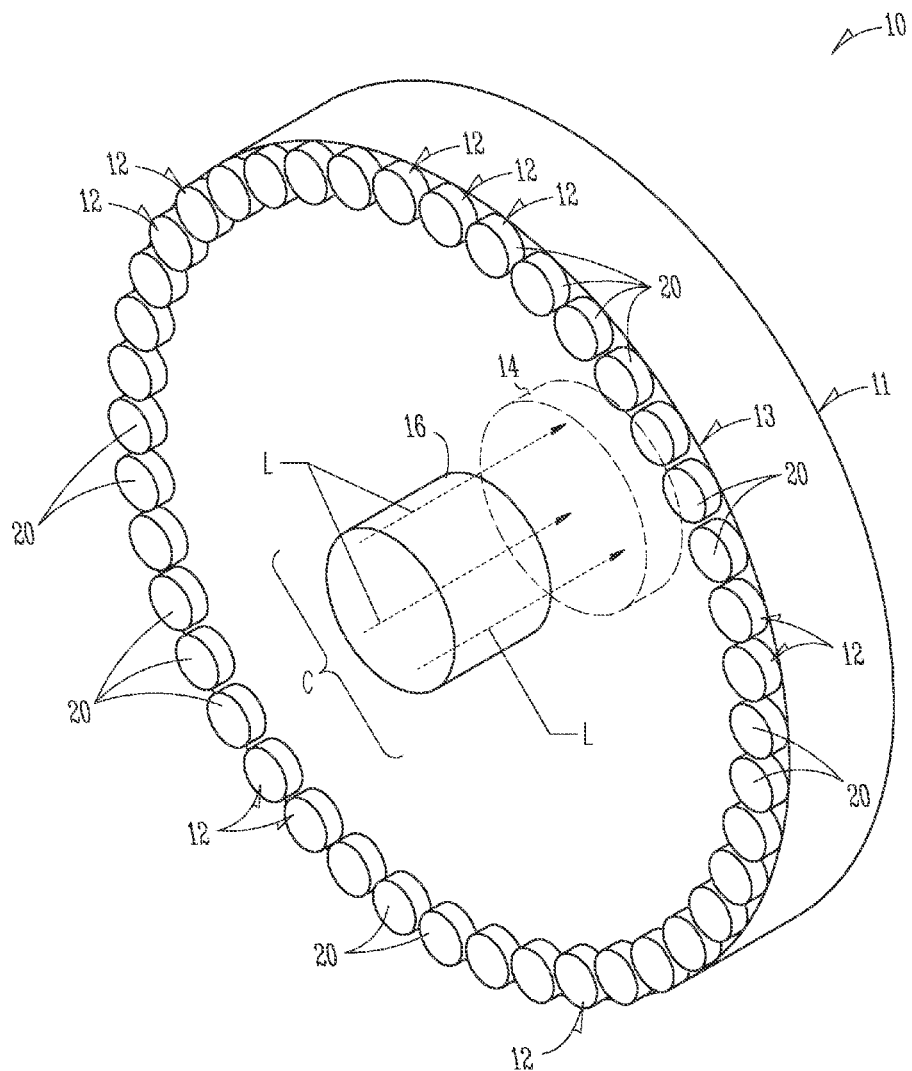
FIG. 8 shows a perspective view of another example optical zoom system where light is passing through a third aperture with 1× magnification.

120 degree FOV natural imaging performance may be achieved through a high efficiency simple pass through optical system (see, e.g., FIG. 8). The 12 degree FOV 10× zoom configuration may require an optical system which provides optical magnification as well as increased light collection area over the human eye.

Some embodiments described herein will utilize sub-aperture light conditioning. In such embodiments, it would be beneficial if the hands-free zoom optics could benefit future development through demonstration of key sub-aperture light field conditioning.

The 12 degree FOV 10× optical zoom systems described herein may utilize sub-aperture lenslets to collect and combine scene energy while providing the imaging resolution required.

In some embodiments, single element diffractive/refractive wide FOV eye piece designs exist may be used for the 10× zoom configuration. In addition, a circular lenslet array may be utilized to collect the radiation field and relay these individual diffraction limited images to the image plane of the eye piece which re-collimates for the eye. This 10× zoom configuration may be rapidly rotated up out of the line-of-sight to provide 1× natural imaging (with the typical 120 degree FOV of the unaided eye).

An example optical zoom system 10 is shown in FIGS. 3 and 4. The optical zoom system 10 includes a first inward-facing surface 12 that is at least partly reflective and a second inward-facing surface 14 that is at least partly reflective (shown most clearly in FIG. 3).

The optical zoom system 10 further includes a first aperture that includes a plurality of sub-apertures 20 which are positioned around at least a portion of an outer periphery of one of the first and second inward facing surfaces 12, 14. In the example embodiment, at least some of the sub-apertures 20 include an optically powered element.

The optical zoom system 10 further includes a second aperture that is proximate to a central region C of the optical zoom system 10. During operation of the optical zoom system 10, light L is reflected on the first and second inward facing surfaces 11, 13 as the light L travels between the first aperture 12 and the second aperture 14. The light L is optically combined into a single image before exiting the second aperture 14.

In some embodiments, the light L is incoherently combined into a single image before exiting the second aperture 14 to increase effective light collection. In other embodiments, light L is coherently combined into a single image before exiting the second aperture 14 to increase effective light collection and diffraction limited resolution. Other applications are contemplated where the light L is incoherently and coherently combined into a single image before exiting the second aperture 14.

Figure 6:
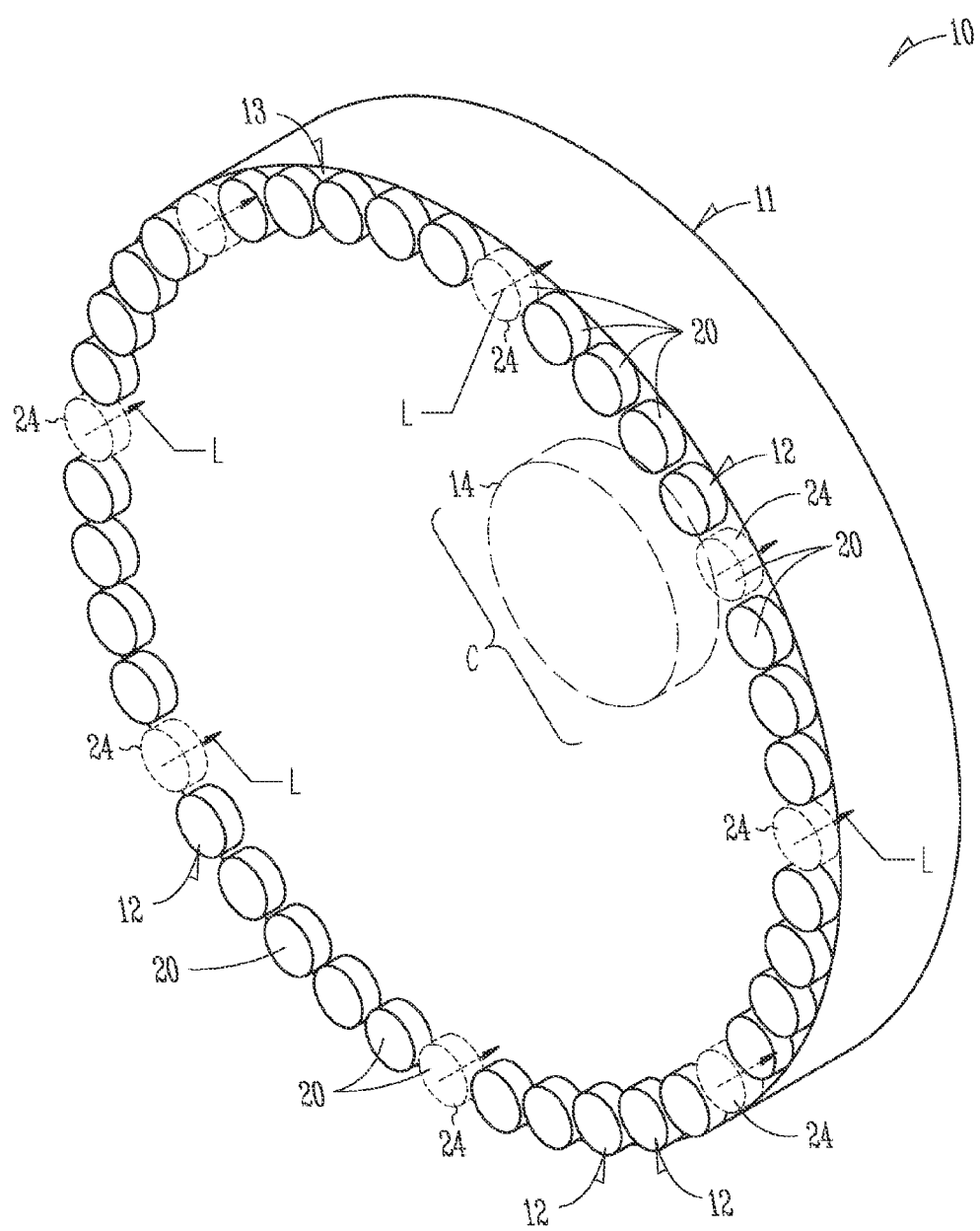
FIG. 6 shows a perspective view of the example optical zoom system shown in FIGS. 3 and 4 where light is passing through apertures with 5× magnification.
Figure 7:
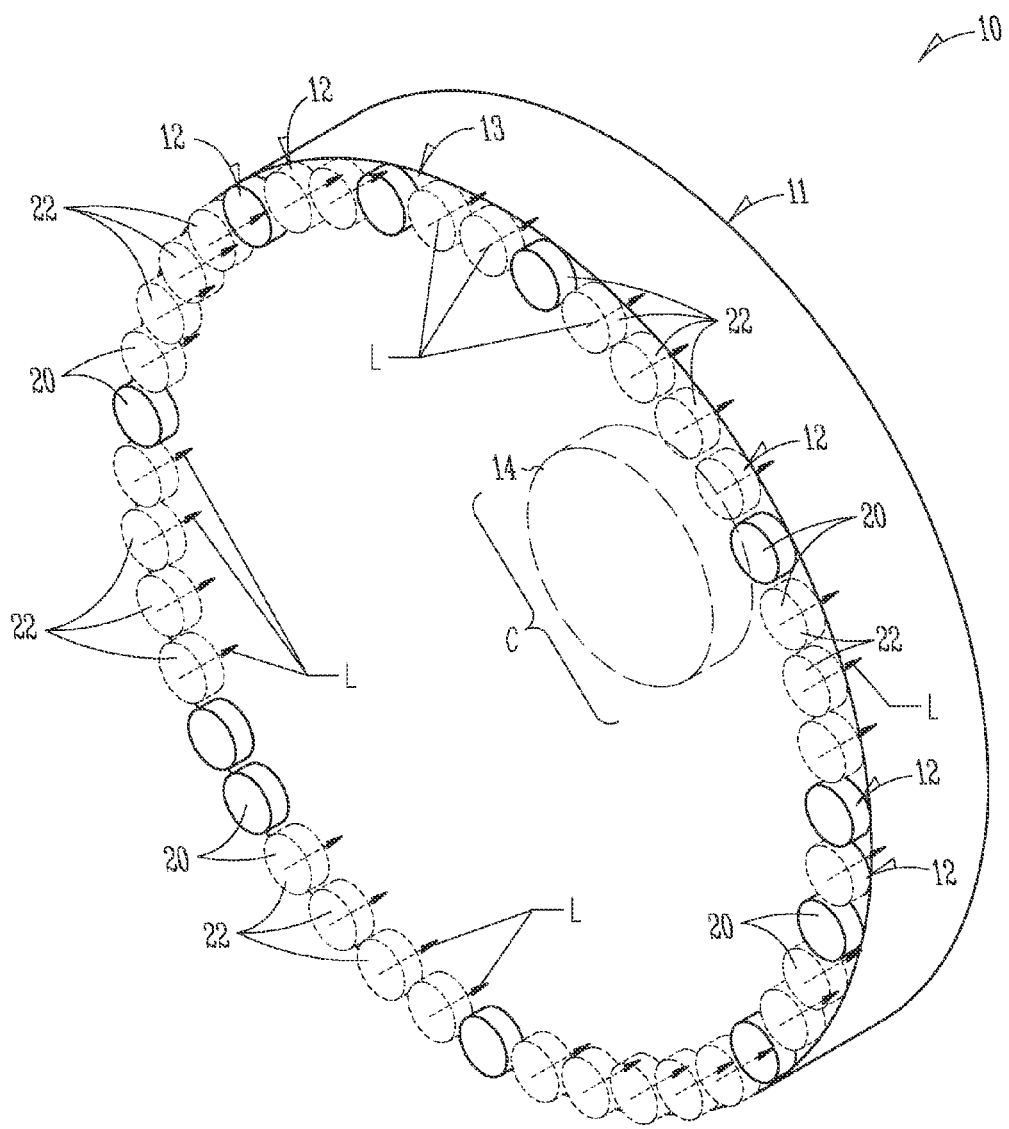
FIG. 7 shows a perspective view of the example optical zoom system shown in FIGS. 3 and 4 where light is passing through apertures with 2× magnification.

In the example embodiment that is shown in FIGS. 3-7, the plurality of sub-apertures 20 includes a first group 22 of sub-apertures 20 at a first magnification (first group 22 is shown as dashed lines in FIG. 7) and a second group 24 of sub-apertures 20 at a second magnification (second group 24 is shown as dashed lines in FIG. 6). In addition, the plurality of sub-apertures 20 may further include a third group 26 of sub-apertures 20 at a third magnification (third group 26 is shown as dashed lines in FIG. 5).

As an example, the first magnification may be 10× magnification, the second magnification may be 5× magnification and the third magnification may be 2× magnification. It should be noted that other magnifications are contemplated for the first, second and third groups 22, 24, 26 of sub-apertures 20.

As shown in FIG. 3, optical zoom system 10 may further include an optical switch 30 that opens one of the groups of sub-apertures (e.g., first group 22) and closes the other groups (e.g., second and third groups 24, 26) of sub-apertures. The selection as to which of the first, second and third groups 22, 24, 26 to open and close using the optical switch 30 will be determined in part by the desired magnification that is to be produced by the optical zoom system 10.

The type of optical switch 30 that is to be used in the optical zoom system 10 will be determined in part by the desired application where the optical zoom system 10 is to be utilized. As examples, the optical switch 30 may be a liquid crystal light valve or a mechanical shutter.

In the example embodiment that is shown in FIG. 8, the optical zoom system 10 may further include a third aperture 16 that proximate to the central region C of the optical zoom system 10. In this type of embodiment, light L travels through the third aperture 16 and the second aperture 14. As an example, the third aperture 16 may provide 1× magnification.

In addition, the optical switch 30 may be adapted to (i) open at least some of sub-apertures 20 and close the third aperture 16; or (ii) close the sub-apertures 20 and open the third aperture 16. The selection as to whether to open any of the sub-apertures 20 or the third aperture 16 using the optical switch 30 will be determined in part by the desired magnification that is to be produced by the optical zoom system 10.

In the example embodiment that is shown in FIG. 4, the optical zoom system 10 may further include a frame 40 that secures the optical zoom system 10. In some embodiments, the frame 40 may be movable relative to the rest of the optical zoom system 10 so that the optical zoom system 10 is stored out of the way when there is no need for the optical zoom system 10.

Some example frames include glasses or a helmet, although other types of frames are contemplated for use. The selection as to which type of frame 40 to use with the optical zoom system 10 will be depend in part on the application where the optical zoom system 10 is to be utilized.

Figure 9:
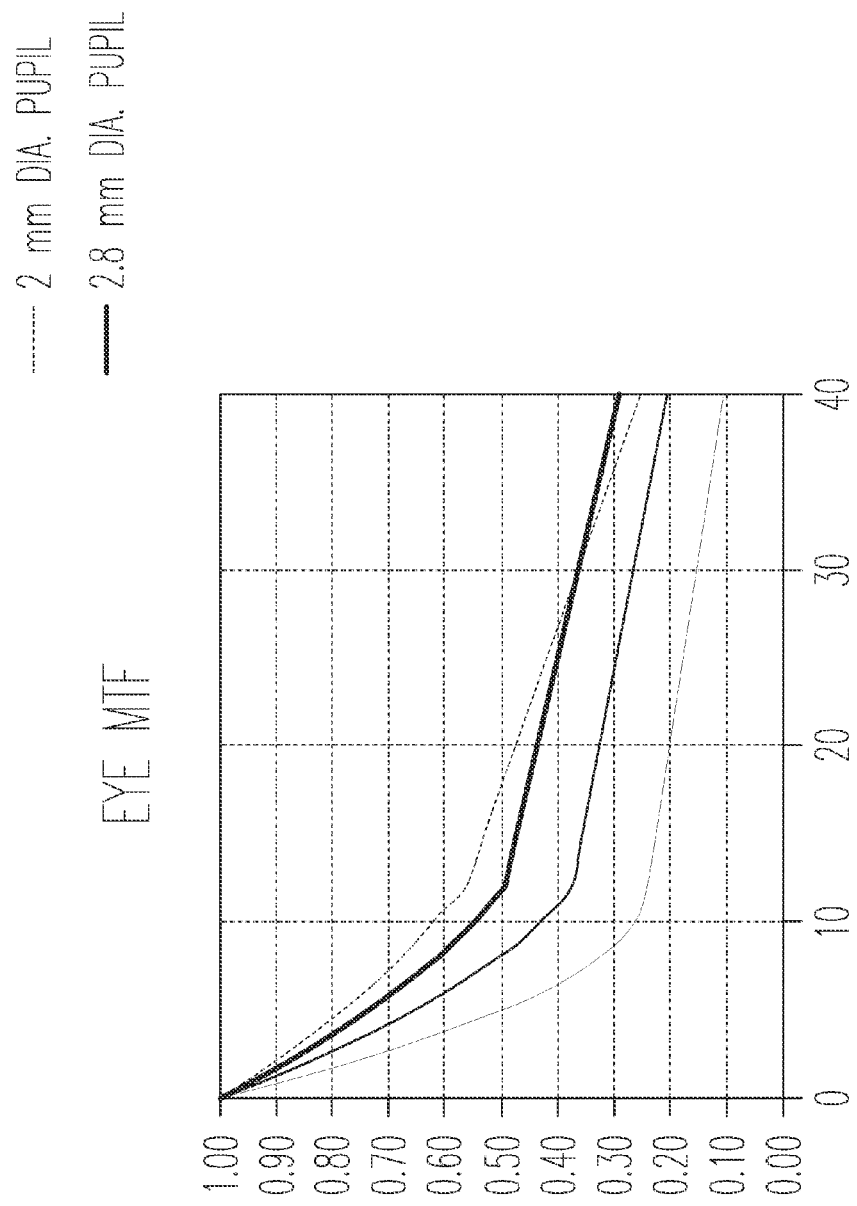
FIG. 9 shows some example human eye MTF curves.

FIG. 9 shows some example human eye MTF curves. The MTF curves represent the foveal resolution of the human eye for a range of pupil diameters. Cursory inspection indicates that at low angular frequencies the 2 mm diameter MTF is the greatest below 30 cycles/degree. The 2.8 mm pupil diameter MTF may be greater than 30 cycles/mm. The 10× zoom concept MTF was calculated for an incoherent combination of the annular lenslets. It should be noted that the human eye produces a retinal resolution that is limited by the 2 mm diameter eye MTF curve at all spatial frequencies.

The optical zoom systems described herein may be used in a variety of applications (e.g., small, light-weight hands-free binoculars that have superior light collection). Other applications are contemplated including, but not limited to, military, hunting, protection, bird watching and entertainment.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, the embodiments may lie in less than all features of a single disclosed embodiment. Thus the following claims are hereby incorporated into the detailed description, with each claim standing on its own as a separate embodiment.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of embodiments of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of embodiments of the invention (s).

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An optical zoom system comprising:
a first inward-facing surface that is at least partly reflective;
a second inward-facing surface that is at least partly reflective;
a first aperture that includes a plurality of sub-apertures which are positioned around at least a portion of an outer periphery of one of the first and second inward facing surfaces, each sub-aperture including an optically powered element, wherein the plurality of sub-apertures includes a first group of sub-apertures at a first magnification and a second group of sub-apertures at a second magnification; and
a second aperture existing proximate a central region of the optical zoom system;
wherein light is reflected on the first and second inward facing surfaces as the light travels between the first aperture and the second aperture and is optically combined into a single image before exiting the second aperture.

2. The optical zoom system of claim 1 wherein the light is incoherently combined into a single image before exiting the second aperture to increase effective light collection.

3. The optical zoom system of claim 1 wherein the light is coherently combined into a single image before exiting the second aperture to increase effective light collection and diffraction limited resolution.

4. The optical zoom system of claim 1 wherein the plurality of sub-apertures includes a third group of sub-apertures at a third magnification.

5. The optical zoom system of claim 4 wherein the first magnification is 10× magnification, the second magnification is 5× magnification and the third magnification is 2× magnification.

6. The optical zoom system of claim 4 further comprising an optical switch that opens one of the groups of sub-apertures and closes the other groups of sub-apertures.

7. The optical zoom system of claim 6 wherein the optical switch is a liquid crystal light valve.

8. The optical zoom system of claim 6 wherein the optical switch is a shutter system.

9. The optical zoom system of claim 1 further comprising a third aperture proximate a central region of the optical zoom system, wherein light travels through the third aperture and the second aperture.

10. The optical zoom system of claim 9 wherein the third aperture provides 1× magnification.

11. The optical zoom system of claim 10 further comprising an optical switch, the optical switch being adapted to open at least some of sub-apertures and close the third aperture or close the sub-apertures and open the third aperture.

12. The optical zoom system of claim 1 further comprising a frame that secures the optical zoom system.

13. The optical zoom system of claim 12 wherein the frame is movable relative to the rest of the optical zoom system.

14. The optical zoom system of claim 13 wherein the frame is a helmet.

15. The optical zoom system of claim 1 wherein the power of the optically powered element in at least some of the sub-apertures is adjustable.

* * * * *